(12) United States Patent
Chen et al.

(10) Patent No.: US 9,959,616 B2
(45) Date of Patent: May 1, 2018

(54) DEVICE FOR READING RESISTOR VALUE WITH COMPUTER VISION AND METHOD THEREOF

(71) Applicant: Yuan Ze University, Taoyuan (TW)

(72) Inventors: Yung-Sheng Chen, Taoyuan (TW); Jeng-Yau Wang, Taoyuan (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 29 days.

(21) Appl. No.: 15/209,770

(22) Filed: Jul. 14, 2016

(65) Prior Publication Data

US 2017/0221200 A1 Aug. 3, 2017

(30) Foreign Application Priority Data

Feb. 2, 2016 (TW) .............................. 105103231 A

(51) Int. Cl.
*G06K 9/62* (2006.01)
*G06T 7/00* (2017.01)
*G06T 7/40* (2017.01)
*G06K 9/46* (2006.01)
*G06T 7/60* (2017.01)
*G06K 9/52* (2006.01)
(Continued)

(52) U.S. Cl.
CPC .......... *G06T 7/0012* (2013.01); *G06K 9/4652* (2013.01); *G06K 9/4661* (2013.01); *G06K 9/52* (2013.01); *G06K 9/6215* (2013.01); *G06K 9/6267* (2013.01); *G06T 5/00* (2013.01); *G06T 7/408* (2013.01); *G06T 7/60* (2013.01); *H01C 1/04* (2013.01); *G06T 2207/20182* (2013.01); *G06T 2207/30164* (2013.01)

(58) Field of Classification Search
CPC .. G06K 9/2027; G06K 9/4661; G06K 9/4652; G06T 2207/30141; G06T 2207/20112; G06T 2207/10024; G06T 7/11; G06T 7/0004; G06T 2207/30164; H01C 1/04
See application file for complete search history.

(56) References Cited

PUBLICATIONS

Yoshihiro Mitani et al., "A Method for Reading a Resistor by Image Processing Techniques", I. Lovrek, R.J. Howlett, and L.C. Jain (Eds.): KES 2008, Part I, LNAI 5177, pp. 433-439, 2008, Springer-Verlag Berlin Heidelberg 2008.*

(Continued)

*Primary Examiner* — Brian Werner
(74) *Attorney, Agent, or Firm* — Chun-Ming Shih

(57) ABSTRACT

Disclosed are a cost-effective light source device that can eliminate highlights or hotspots and reduce halo phenomenon on resistor surface and a method for reading resistor value with computer vision, in which an image of a body of a resistor is extracted through irradiation by an annular light source and reflection by a replaceable diffuse reflection hood such as paper box, paper bowl, or paper cup inside pasted with white paper and extraction by an image extraction device, followed by a series of image processing operations conducted by a control unit to calculate a disposition angle of the resistor in an image. Luminous elements on opposite axial ends of the resistor are activated, according to the disposition angle, for illumination, while luminous elements on opposite lateral sides of the resistor are shut down so that a clear color resistor image can be obtained.

12 Claims, 13 Drawing Sheets

(51) Int. Cl.
*G06T 5/00* (2006.01)
*H01C 1/04* (2006.01)

(56) References Cited

PUBLICATIONS

Kap Luk Chan and et., Reading Resistor Values by Color Image Processing, SPIE vol. 3185, 1997, pp. 157-168.*

* cited by examiner

DEVICE FOR READING RESISTOR VALUE WITH COMPUTER VISION AND METHOD THEREOF

(a) TECHNICAL FIELD OF THE INVENTION

The present invention relates generally to a cost effective light source that can eliminate highlights or hotspots and reduce halo phenomenon on the resistor for reading resistor values with computer vision and a method thereof, and more particularly to a reading method that acquires an image of a body of a resistor and identifies and converts the color of each color bands into a corresponding color code for subsequent calculation and displaying of a resistor value and a reading device associated therewith.

(b) DESCRIPTION OF THE PRIOR ART

Resistor color bands are provided on an electrical resistor for use in an electronic circuit for the purpose of identification of resistor value and tolerance. Conversion of the color bands to color code and resistor value can only be done by a user by recalling what the figure presented by the color code is. Previous studies indicate the following shortcomings exist:

(1) Reading of resistor value is only available for four color bands and reading and identification of five color band resistor value and silver band included resistor value are not available. However, the five color band precision resistor values have also been widely used and the silver color band is commonly involved in the five color band resistor values.

(2) Issues related to light reflection have not been throughout studied and overcome and thus, errors often occur in reading and identification of color bands.

(3) There has been no study conducted for automatic horizontal adjustment for images of resistors that are randomly disposed inclined.

(4) There has been no study conducted for analysis of color band location and color code inversion.

(5) A user must loop and identify color band location on a resistor image and no full automation of color code reading is possible.

(6) A user must put scanning light in alignment with the resistor body and this may be difficult for the user's hands may shake.

In view of these problems, the present invention aims to provide a device and a method for reading resistor value with computer vision to allow four color bands and five color bands to be correctly read.

SUMMARY OF THE INVENTION

The primary object of the present invention is to provide a cost-effective diffuse light source that can eliminate highlights or hotspots and reduce halo phenomenon on resistor surface and method for reading resistor value with computer vision, particularly a method that acquires an high quality image of a body of a resistor by the designed cost-effective diffuse light source and identifies and converts the color of each color band into a color code, and calculate and displays the resistor value read with computer vision.

The method for reading resistor value with computer vision is such that an image of a body of a resistor is extracted through irradiation by an annular light source and reflection by a replaceable diffuse reflection hood such as paper box, paper bowl, or paper cup inside pasted with white paper and extraction by an image extraction device, followed by a series of image processing operations conducted by a control unit to calculate a disposition angle of the resistor in an image. Luminous elements on opposite axial ends of the resistor are activated, according to the disposition angle, for illumination, while luminous elements on opposite lateral sides of the resistor are shut down so that a clear color resistor image having high quality resistor image with no light reflection and low halo can be obtained for being subsequently adjusted to the horizontal and subjected to a series of processing to extract color bands. The control unit can be trained to recognize the color bands and establish the colors of the resistor body and store different files of color classifier for each 4-band, 5-band, and resistor body color database. In an actual operation of reading resistor value with computer vision, the device and the method can be applied to have the control unit calculate and recognize the resistor to be read for displaying a correct resistor value.

The device for reading resistor value with computer vision comprises at least an observation table on which a resistor is positionable, an annular light source, a reflection hood, a microscope, and a control unit.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention as set forth in the appended claims.

Figure 1:
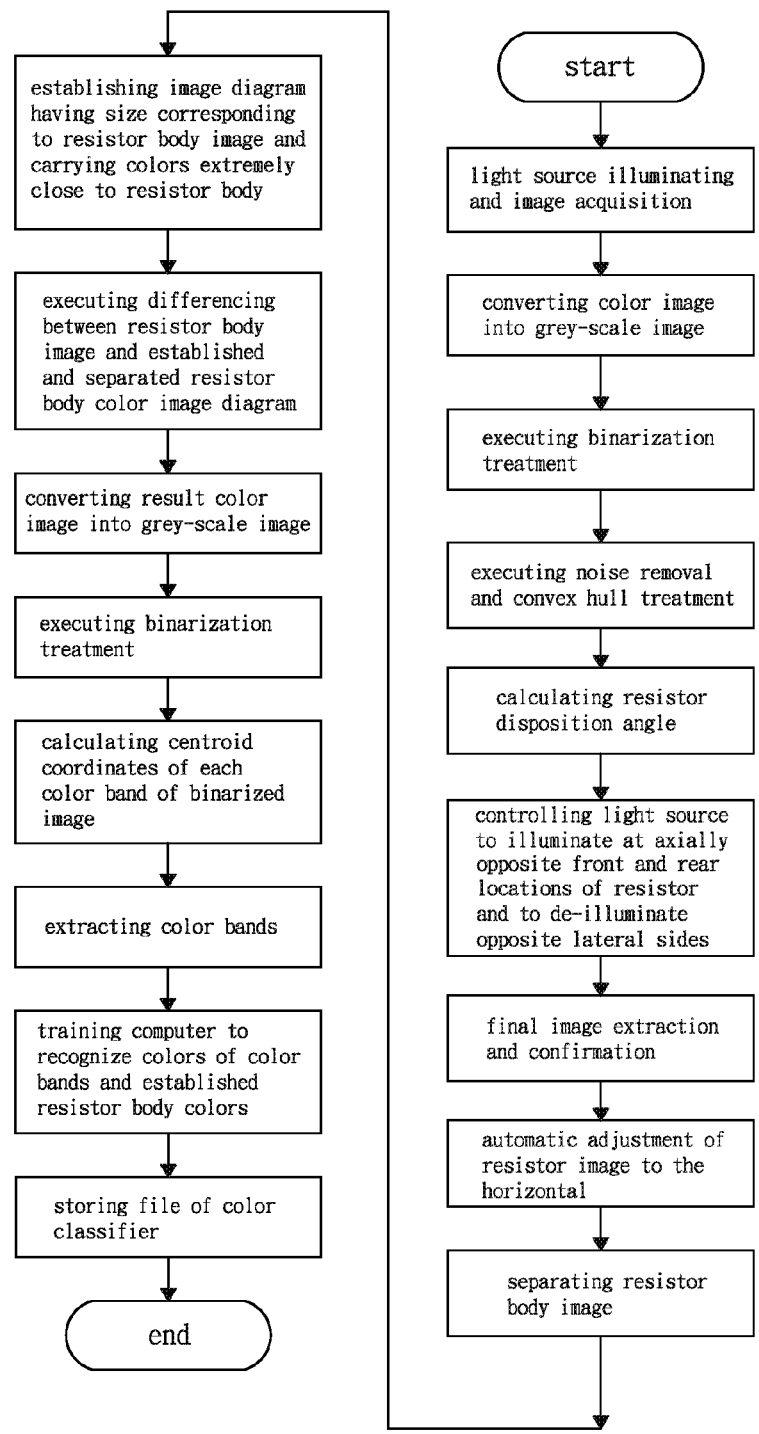
FIG. 1 is a flow chart illustrating a file establishing process for resistor color according to the present invention.
Figure 3:
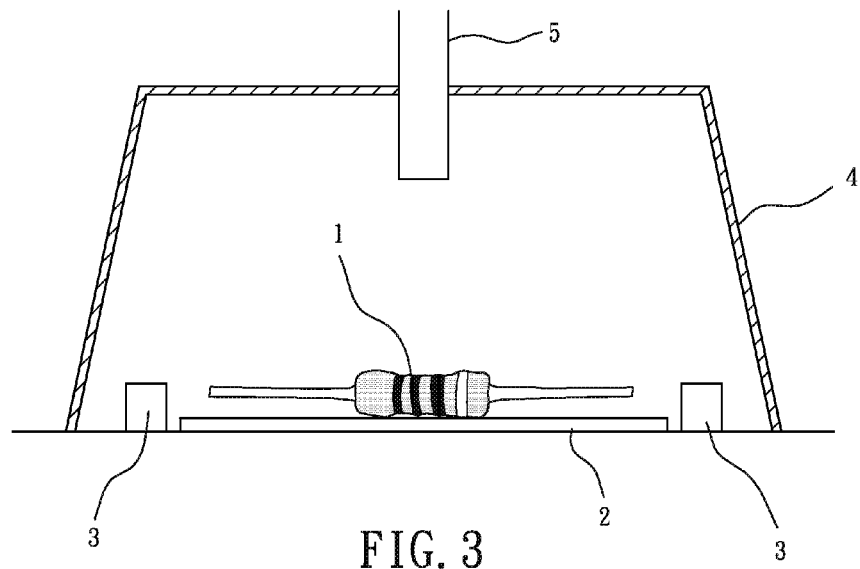
FIG. 3 is a side elevational view, in a sectioned form, showing an example of using a reading device of the present invention to read color bands of a resistor.
Figure 4:
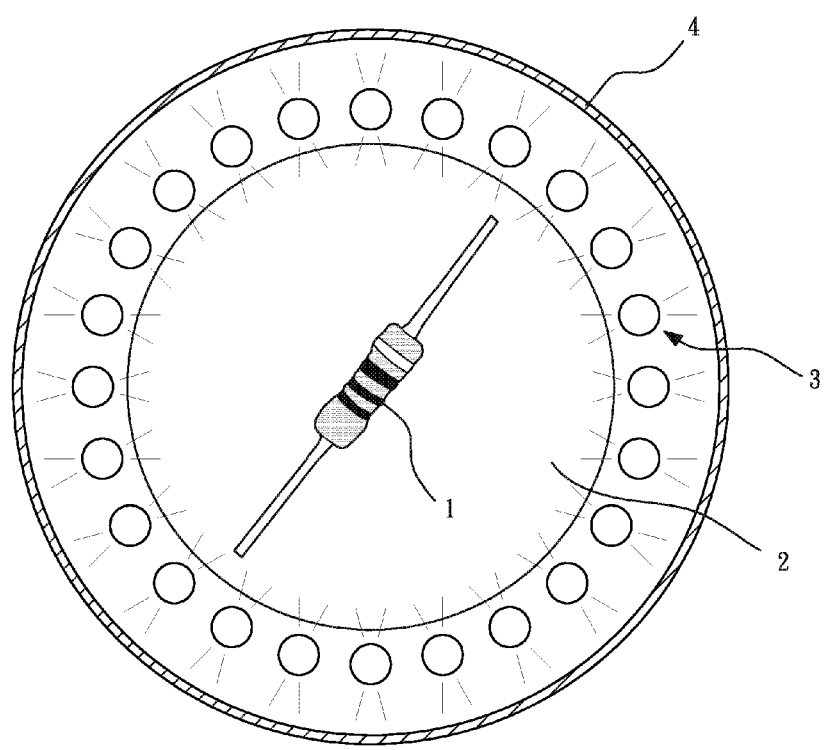
FIG. 4 is a top view of the example of using the reading device of the present invention to read the color bands of the resistor.
Figure 5:
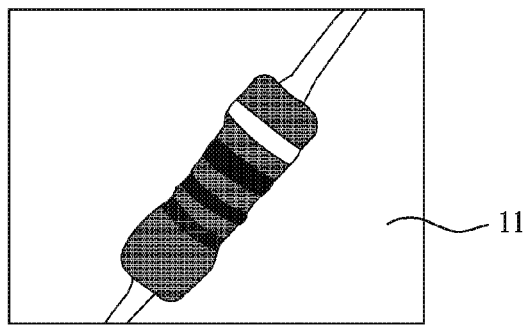
FIGS. 5-20 demonstrate resistor color file establishing and reading status diagrams according to the present invention.

Referring to FIG. 1, in combination with FIGS. 3-19, which are a flow chart illustrating a resistor color file establishing process and status diagrams according to the present invention. As shown in the drawings, the present invention at least comprises an observation table 2 on which a resistor is positionable, an annular light source 3, a replaceable paper box or paper bowl or paper cup inside pasted with white paper of diffuse reflection hood 4, a microscope 5, and a control unit (not shown in the drawings) and in file establishing or reading for resistor colors, a resistor 1 is positioned on the observation table 2 and through irradiation by the annular light source 3 and reflection by the replaceable diffuse reflection hood 4 and extraction and transmission of a resistor image 11 by the microscope 5 to the control unit, file establishing or reading of a resistor value can be performed. In reading a four-color colorband or a five-color colorband, a correspondence table of codes, multiplier, and tolerance of a colorband and resistance computation rules are applied to calculate a resistor value. The present invention provides a computer program based on the correspondence table and the resistance computation rules to allow the control unit to identify colors involved in a colorband and then look up the table an calculate the resistor value. The present invention establishes a system that is capable of reliably and automatically recognizes an image 11 of a resistor and to read the resistor value thereof. The four-color colorband and five-color colorband are taken as subjects of study, including: (1) illumination with cost-effective light source and acquisition of image; (2) detection of resistor direction; (3) isolation or separation of body of resistor image 11; (4) binarization of colorband of resistor image 11; (5) extraction of colorband of resistor image 11; (6) training and recognition of body color and colorband color of resistor image 11; and (7) analysis of position switching of colorband color code and inversion or flipping-over of reading color code sequence, which comprises the following steps:

(1) controlling annular light source 3 and acquiring an image of a resistor 1 (see FIGS. 3, 4, and 5).

(2) Converting a color image of the resistor image 11 (FIG. 5) into a gray-scale image and executing a binarization process (see FIGS. 1 and 6), wherein the purpose of binarization of the resistor image 11 comprises two stages, of which the first stage is to detect a directional angle of the resistor 1 in the resistor image 11 and the second stage is to extract a colorband in order to obtain an excellent effect of isolating and extracting the colorband. The present invention provides an adaptive image binarization method, which provides an even better result of resistor binarization to acquire sufficient information of the resistor image 11 and effectively suppress background noise, and which involves the following equation:

$$T_{yj} = m + \sqrt{j \times \Sigma p_i^2 / n}$$

where m is the local sample mean, j is a scaling factor of yj, n is the total number of pixels in the gray image, and $p_i$ is a pixel value of the gray-scale image.

Figure 9:
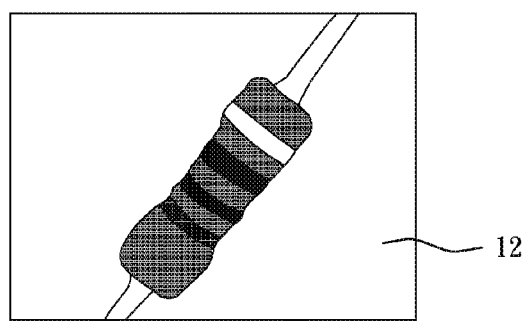

(3) executing noise removal and convex hull treatment and calculating a disposition angle of the resistor 1 in the resistor image 11 (see FIG. 7), of which a process is as follows:

where one or multiple blocks may be generated by the convex hull treatment of the binarized resistor image 11, wherein in case that one single block is generated, a moment of inertia based process is used to calculate a directional angle of the single block in order to determine an angle of a center line of the block that exhibits the lowest moment of inertia:

$$\theta_{rad} = \frac{1}{2} \tan^{-1}\left(\frac{2M_{xy}}{M_{yy} - M_{xx}}\right)$$

where $M_{xy}$ is xy moment of inertia, $M_{xx}$ is xx' moment of inertia, and $M_{yy}$ is yy' moment of inertia; and wherein in case that multiple blocks are generated, a moment of inertia based process is used to calculate a directional angle of the largest one of the blocks, such that the directional angle is regarded as the directional angle of the resistor 1;

where in the above calculation, $\theta_{rad}$ is of the unit of radian, and a process involving the following algorithm can be used to calculate an angle $\theta_{ar}$ for automatically adjusting the resistor 1 in the resistor image 11 to the horizontal is as follows:

$$\theta_{deg} = \theta_{rad} \times 360/2\pi$$

if $\theta_{deg} \leq 90°$, then $\theta_{ar} = -\theta_{deg}$, else $\theta_{ar} = -(180 - \theta_{deg})$ (4) after the calculation of the disposition angle of the resistor 1, controlling the annular light source 3 such that luminous elements 31 that are located at opposite axial ends of the resistor 1 are energized for illumination, while luminous elements 31 that are located on opposite lateral sides of the resistor 1 are de-energized and set off (see FIG. 8) and then, the microscope 5 is used to extract a clear and sharp color resistor image 12 that is of no light reflection and low halo (see FIG. 9).

Figure 10:
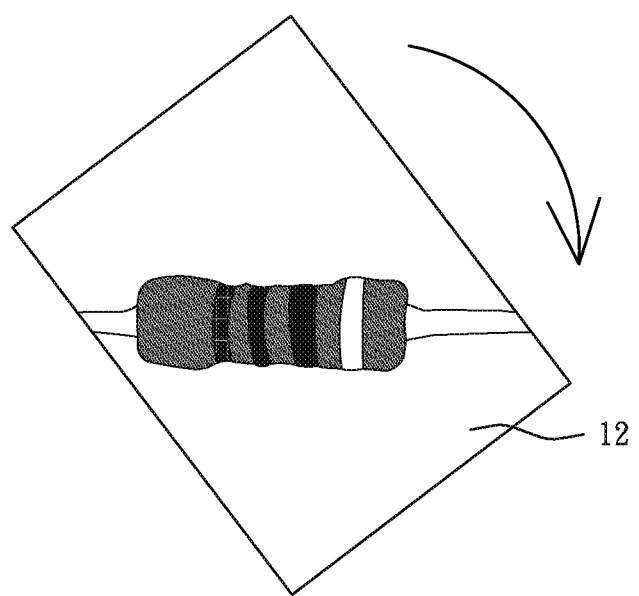
Figure 11:
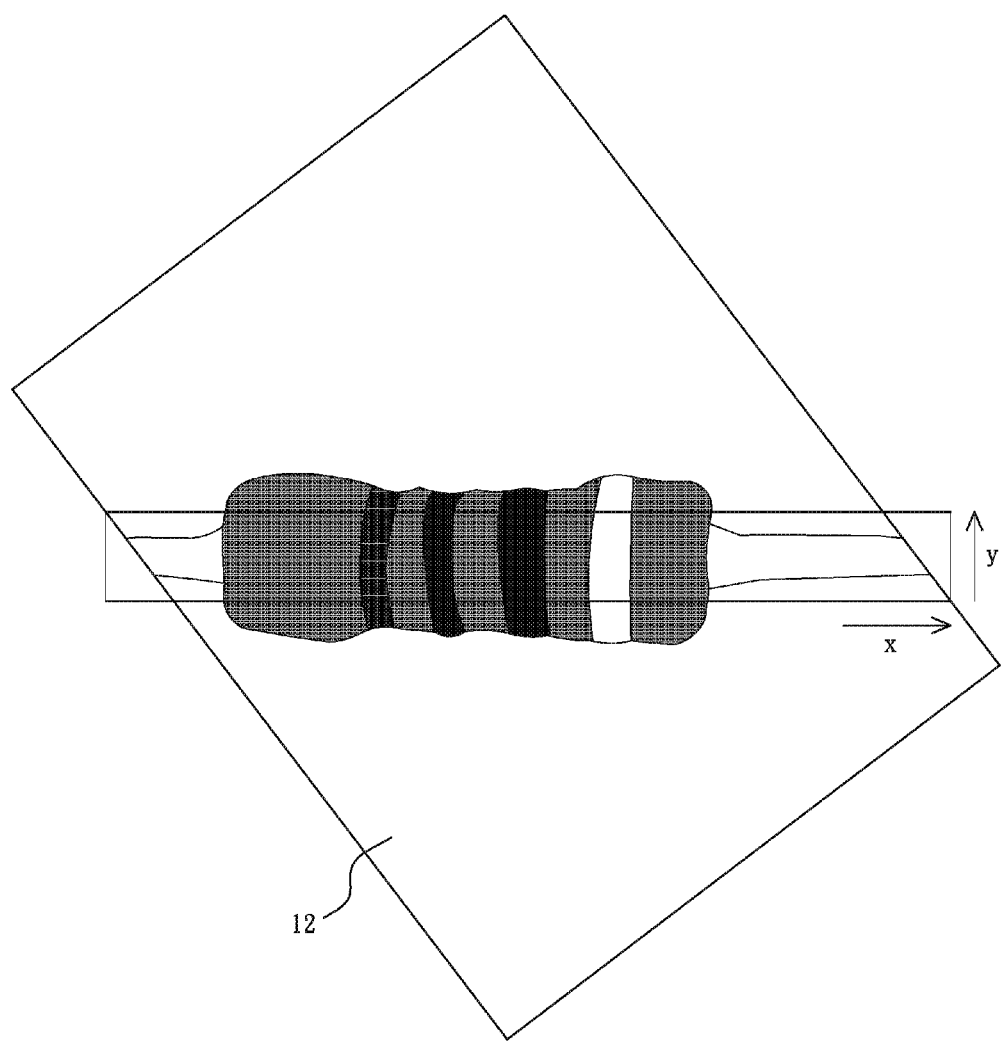
Figure 12:
Figure 13:
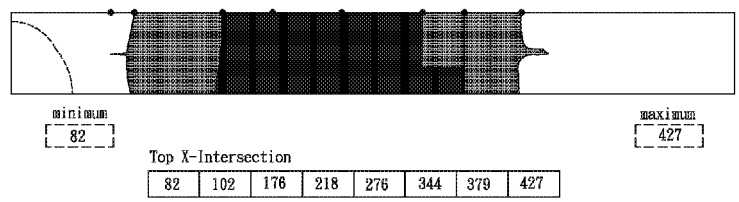
Figure 14:
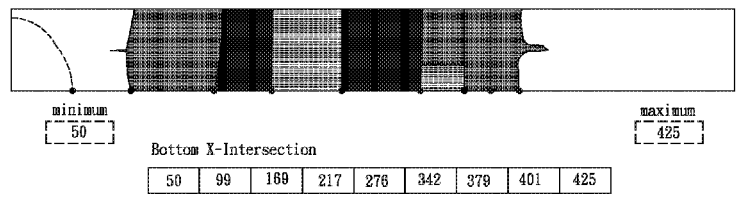

(5) automatically adjusting the image of the resistor 1 in the clear color resistor image 12 to the horizontal (see FIG. 10, in which the resistor that is shown is the resistor 1).

Figure 15:
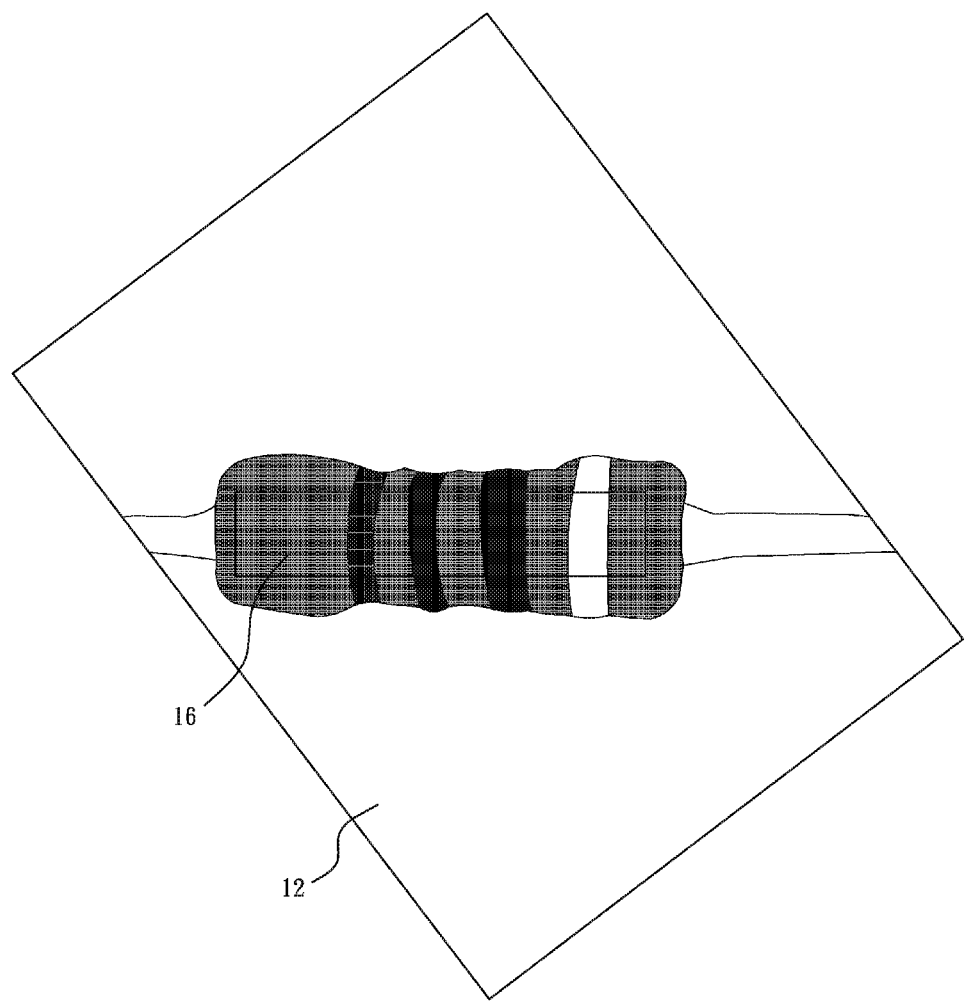
Figure 16:
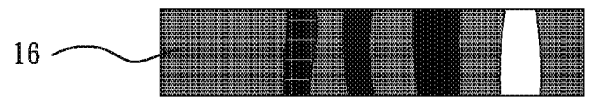
Figure 17:

(6) isolating or separating a body image 16 of the resistor in the clear color resistor image 12 (see FIGS. 11-16), wherein the clear color resistor image 12 that has been adjusted to the horizontal is subjected to calculation of coordinates of a centroid thereof and, based on empirical rules, a y-axis range of the resistor 1 is defined and isolated by including 40 pixels above and 40 pixel below the y-axis coordinate of the centroid (see FIGS. 11 and 12) and then an image erosion treatment (see FIGS. 13 and 14) is applied to calculate and determine coordinates of intersection points of top and bottom boundaries of the resistor 1 in the y-axis range such that a relatively large one of the minimum x-axis coordinates of the intersection points of the top and bottom boundaries is taken as an x-axis limit of the left side of the resistor (such as the minimum shown in FIG. 13 that is 82) and a relatively small one of the maximum x-axis coordinates of the intersection points of the top and bottom boundaries is taken as an x-axis limit of the right side of the resistor (such as the maximum shown in FIG. 14 that is 425), whereby a resistor body image 16 as shown in FIGS. 15 and 16 can be isolated and identified.

Figure 21:
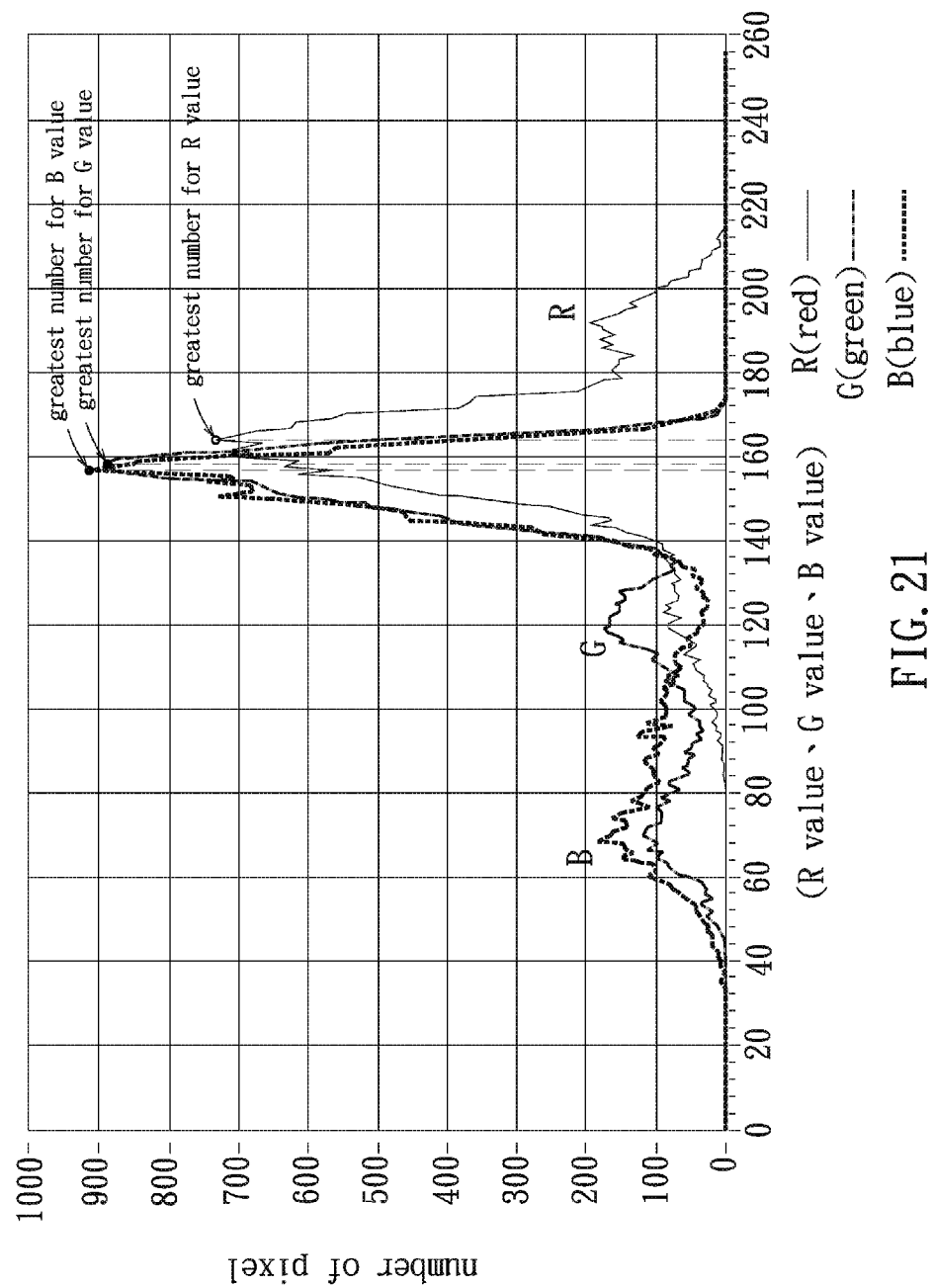
FIG. 21 illustrates histograms of red, green, and blue colors of resistor body image colors according to the present invention.

(7) establishing and separating a resistor body color image diagram 17 (see FIG. 17) having the same size as that of the resistor body image 16 and carrying the same color as that of resistor body, wherein a process adopted is as follows: computer calculating and analyzing red/green/blue histograms (FIG. 21) for the resistor body image 16 (FIG. 16) and counting individual pixel numbers of R (red) values, G (green) values, and B (blue) values of the resistor body image 16 and selecting the one of the R (red) values that has the greatest pixel number, the one of the G (green) values that has the greatest pixel number, and the one of the B (blue) values that has the greatest pixel number, where in the example given in FIG. 21, the R (red) value having the greatest pixel number is 165, the G (green) value having the greatest pixel number is 158, and the B (blue) value having the greatest pixel number is 156 and wherein the R (red) value of 165, the G (green) value of 158, and the B (blue) value of 156 are used to establish and separate a resistor body color image diagram 17 (FIG. 17) that has the same size as that of the resistor body image 16 and carries a color extremely close to that of resistor body.

Figure 18:
Figure 19:

(8) executing image differencing (subtracting) absolute value treatment on the resistor body image 16 and the resistor body color image diagram 17 so established to obtain a result color image and converting the result color image into a gray-scale image (FIG. 18).

(9) executing binarization treatment, where the YJ adaptive binarization process so established is applied to execute binarization treatment to generate a binarized image and calculating coordinates of a centroid of each color band (FIG. 19) and extracting a color band sample according to a predetermined range of the coordinates of each centroid, wherein a process for determining the number of color bands and extracting the color bands are as follows:

(I) if the number of the color bands is counted 5 for pixels of the binarized image extending upward and downward by 80 pixels from the middle, then the number of the color bands is 5;

(II) otherwise the number of color bands is determined by recognizing the resistor body color, where height of the binarized colorband is taken as the first priority factor for selecting resistor color band candidate and the YJ adaptive binarization process mentioned herein provides an excellent effect of suppressing noise in order to obtain a correct result. The colorband centroid is selected, according to the number of the color bands, from the binarized image as the centroid of the color band having a relatively great color band height (see FIG. 19), where the colorband sample is extracted by extending from a center taken as the centroid x-axis coordinate and the centroid y-axis coordinate calculated in step (6) toward both left side and right side by 20 pixels and towards both top and bottom sides by 80 pixels.

(10) training a computer to recognize the resistor body color and the colorband colors so established and storing different files of color classifier for each 4-band, 5-band, and resistor body color of a color classifier such that the resistor body color so established and the colorband sample so extracted are used for training in a color learning phase and stored in the classifier files for the purpose for recognition in a resistor reading phase.

Figure 2:
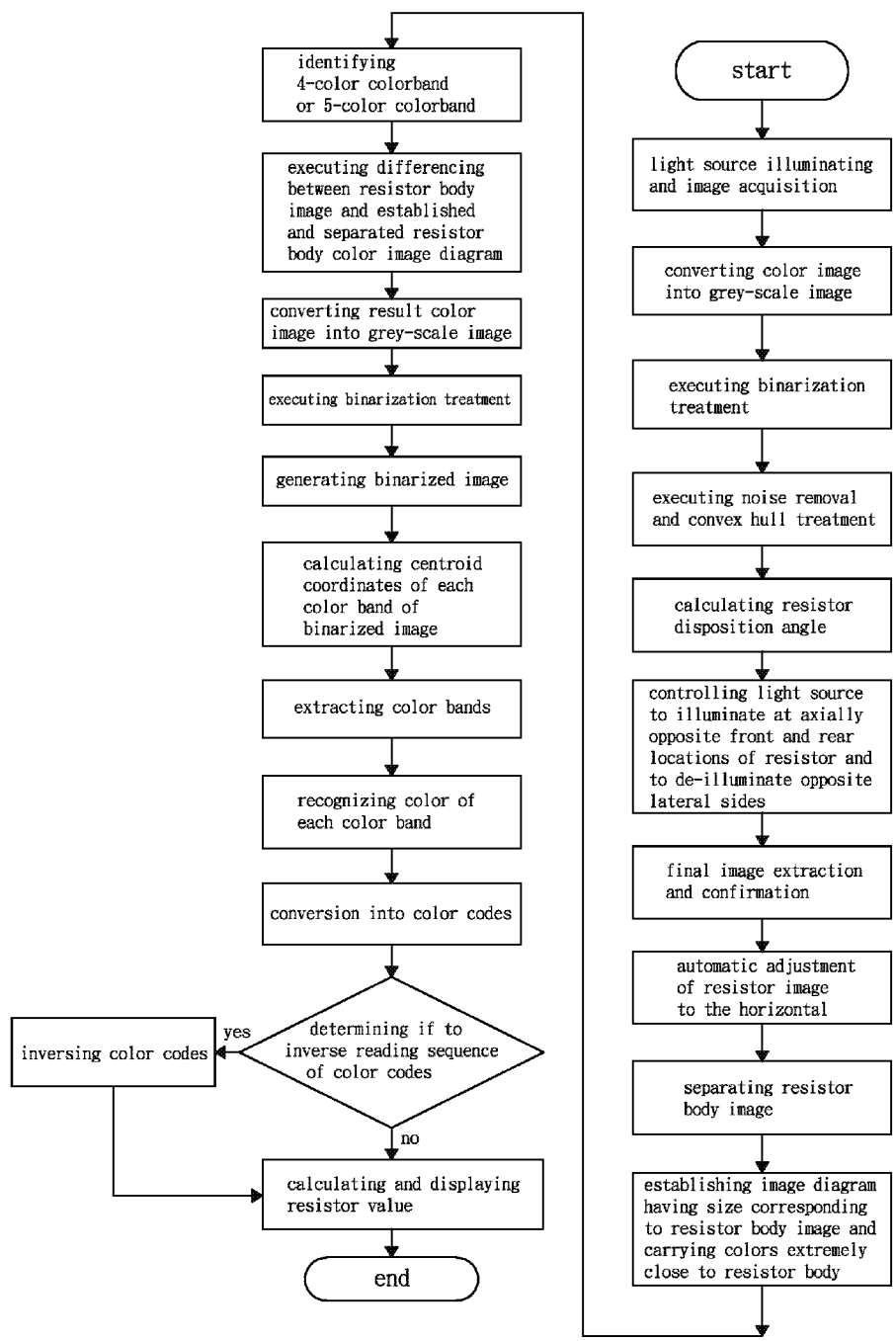
FIG. 2 is a flow chart illustrating a reading process according to the present invention.

Referring to FIG. 2, in combination with FIGS. 3-20, which are a flow chart illustrating a resistor color reading process and status diagrams according to the present invention, the resistor color reading according to the present invention comprises the following steps:

(1) controlling an annular light source 3 for illumination and acquiring an image of a resistor 1 (see FIGS. 3 and 4).

Figure 6:
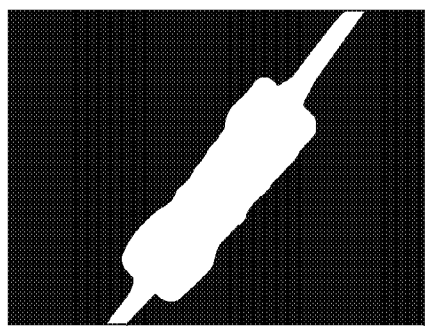

(2) converting a color image of the image 11 of the resistor into a gray-scale image and executing binarized treatment (see FIGS. 5 and 6).

Figure 7:
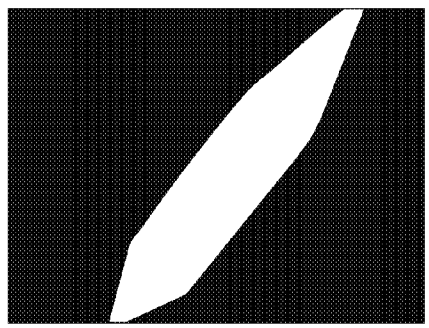
Figure 8:
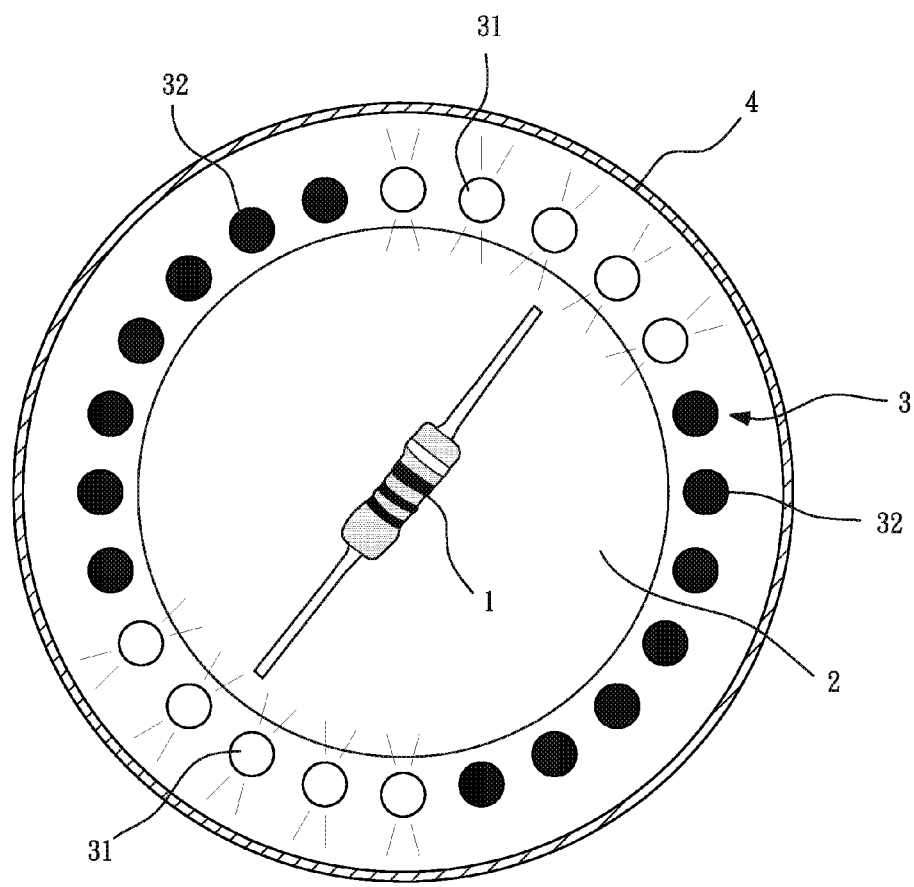

(3) executing noise removal and convex hull treatment and calculating a disposition angle of the resistor 1 in the resistor image 11 (see FIG. 7).

(4) controlling the annular light source 3 such that luminous elements 31 that are located at opposite axial ends of the resistor 1 are energized for illumination, while luminous elements 31 that are located on opposite lateral sides of the resistor 1 are de-energized and set off (see FIG. 8) and then, a microscope 5 is used to extract a clear and sharp color resistor image 12 that is of no light reflection and low halo (see FIG. 9).

(5) automatically adjusting the clear color resistor image 12 such that the image of the resistor 1 is set to the horizontal (see FIG. 10, in which the resistor that is shown is the resistor 1).

(6) isolating or separating a body image 16 of the resistor in the clear color resistor image 12 (see FIGS. 11-16).

(7) establishing and separating a resistor body color image diagram 17 (see FIG. 17) having the same size as that of the resistor body image 16 and carrying the same color as that of resistor body, wherein a process adopted is as follows: computer calculating and analyzing red/green/blue histograms (FIG. 21) for the resistor body image 16 (FIG. 16) and counting individual pixel numbers of R (red) values, G (green) values, and B (blue) values of the resistor body image 16 and selecting the one of the R (red) values that has the greatest pixel number, the one of the G (green) values that has the greatest pixel number, and the one of the B (blue) values that has the greatest pixel number to establish and separate a resistor body color image diagram 17 (FIG. 17) that has the same size as that of the resistor body image 16 (FIG. 16) and carries a color extremely close to that of resistor body.

(8) recognizing the resistor body image 16 as a four-color colorband resistor or a five-color colorband resistor.

(9) executing absolute differencing treatment on the resistor body image 16 and the resistor body color image diagram 17 so established and converting a result color image into a gray-scale image (FIG. 18).

(10) executing binarization treatment to obtain a binarized image and calculating coordinates of a centroid of each color band (FIG. 19), and extracting a colorband sample covering 20 pixels (in both leftward and rightward directions)×80 pixels (in both upward and downward directions) about the coordinates of the centroid.

(11) recognizing and converting the color of each color band sample into a color code.

Figure 20:
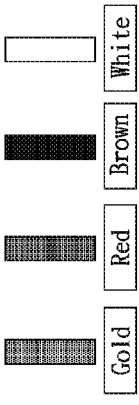
Figure 20:
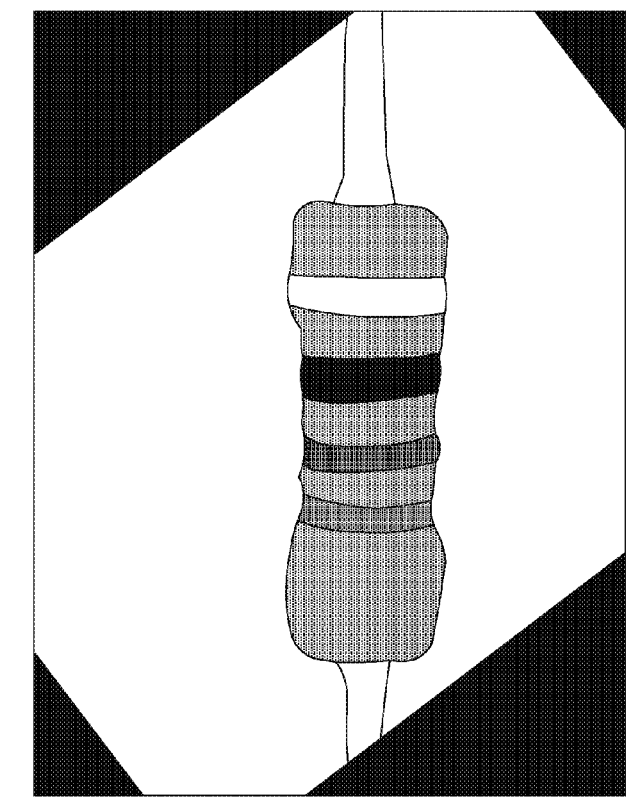

(12) operating the control unit to read and calculate the resistor value and display a result (see FIG. 20).

The present invention reads the color bands by the sequence that is determined according the rule of being from the left end to the right end and the color bands or the resistors, after being extracted, are converted into the color code and the resistor value can be then calculated according to predetermined formula. When the clear color resistor image is automatically adjusted to the horizontal, the tolerance band may be on the left end or the right end and the present invention provides functions of colorband code position switching analysis and reading color code in an inversed sequence. Inversion of color code is determined according to the analysis of the following two situations:

(1) if the first or second color band on the left end is recognized as a gold or silver one, then the color codes are inversed or flipped over.

Figure 22:
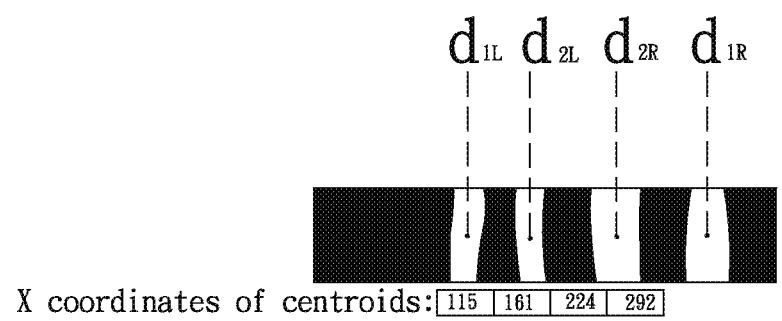
FIG. 22 illustrates a reading status diagram of analyzing and determining if to inverse or flip over reading sequence of color bands according to the present invention.

(2) the distance between color bands are inspected and identified (see FIG. 22), where $d_{1L}$-$d_{2L}$: centroid distance between the first color band and the second color band on the left end;

$d_{1R}$-$d_{2R}$: centroid distance between the first color band and the second color band on the right end; and a mechanism for comparison of $d_{1L}$-$d_{2L}$ and $d_{1R}$-$d_{2R}$ is activated only when the first color band and the last color band are of a color of brown, red, green, blue, purple, and grey and when $d_{1L}$-$d_{2L}$>$d_{1R}$-$d_{2R}$, the reading sequence of the color band is inversed or flipped over.

The above examples are given to demonstrate the best mode of practicing the present invention, but not for imposing undue constraints to the present invention. Minor modifications and variations, without departing the essence of the present invention, are considered falling within the scope of the present invention.

In summary, the present invention involves a control unit to train color bands and establish colors of a resistor body and storing different files of color classifier for each 4-band, 5-band, and resistor body color so that in reading a resistor, an image of the resistor is acquired for identifying the color of each color band for being subsequently converted into a color code, which is then calculated to obtain and display the value of the resistor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A method for reading resistor value with computer vision comprising:
    acquiring an image of a resistor to extract color bands;
    training the color bands for 4-band, 5-band and establishing colors of a body of the resistor in a control unit and storing different files of color classifier for each 4-band, 5-band, and resistor body color;
    in reading a resistor, extracting an image of the resistor to be read;
    converting the color image so extracted into a gray-scale image, executing binarization treatment, and executing noise removal;
    calculating a resistor disposition angle in the image, activating luminous elements at opposite axial ends of the disposition position of the resistor according to the angle for illumination, while luminous elements on opposite lateral sides of the resistor are deactivated in order to extract a color resistor image having no light reflection and low halo;
    adjusting the clear color resistor image such that the resistor in the image is set to the horizontal and separating a resistor body image;
    establishing a resistor body color image diagram having a size that is the same as that of the resistor body image and carrying colors;
    executing differencing between the resistor body image and the resistor body color image diagram and converting a result color image of differencing into a gray-scale image and executing binarization on the gray-scale image with a binarization process to generate a binarized image; and
    calculating coordinates of a centroid of each of the color bands of the resistor in the binarized image and extracting the color bands according to an x-axis coordinate of the centroid and a y-axis coordinate of a centroid of the resistor body image.

2. The method for reading resistor value with computer vision according to claim 1, wherein the binarization treatment comprises a first stage of detecting a directional angle of the resistor of the resistor image and a second stage of extracting the color bands.

3. The method for reading resistor value with computer vision according to claim 1, wherein the resistor image, after binarization, is subjected to convex hull treatment to generate one or multiple blocks.

4. The method for reading resistor value with computer vision according to claim 1, wherein adjusting the clear color resistor image to the horizontal comprises calculating a directional angle of a single block or a largest one of multiple blocks with a moment of inertia based process and calculating an angle of a centroid line of the block with a lowest moment of inertial process.

5. The method for reading resistor value with computer vision according to claim 1, wherein a y-axis range of a resistor body is separated by re-calculating coordinates of the centroid of the clear color resistor image that has been adjusted to the horizontal are calculated and selecting 40 pixels above and 40 pixels below a y-axis coordinate of the centroid, reducing an x-axis range of the y-range resistor body by calculating coordinates of intersection points of top and bottom boundaries of the y-axis range, comparing and selecting a large one of minimums of the x-axis coordinates of the intersection points of the top and bottom boundaries as an x-axis range in a left end and comparing and selecting a small one of maximums of the x-axis coordinates of the intersection points of the top and bottom boundaries as an x-axis range in a right end so as to separate a resistor body image.

6. The method for reading resistor value with computer vision according to claim 1, wherein the step of comparing and selecting a relatively large one of minimums of the x-axis coordinates of the intersection points of the top and bottom boundaries as an x-axis range in a left end comprises providing histograms for values of basic colors of red, green, and blue of pixels of the resistor body image, counting individual pixel number of the red values, the green values, and the blue values, and selecting the red value having a greatest pixel number, the green value having a greatest pixel number, and a blue value having a greatest pixel number to establish the resistor body color image diagram.

7. The method for reading resistor value with computer vision according to claim 1, wherein extracting color bands comprises differencing between the resistor body image and the resistor body color image diagram and binarization such that a binarized color band image is obtained and a centroid thereof is calculated to extract a color band sample.

8. The method for reading resistor value with computer vision according to claim 1, wherein extracting color bands is conducted in sequence in a direction from left to right such that the color bands are extracted and converted into color codes with which a predetermined formula is applied to calculate the resistor value.

9. The device and method for reading resistor value with computer vision according to claim 8, wherein calculating the resistor value is such that positions of the color bands are analyzed and when a first one or second one of the color bands on the left end of the resistor is recognized as a gold or silver color, the sequence of reading the color codes is inversed for calculating the resistor value.

10. The method for reading resistor value with computer vision according to claim 8 further comprising sequentially determining a centroid distance between the first color band and the second color band on the left end and a centroid distance between a first color band and a second color band on a right end such that a mechanism of comparison is activated only when the first color band and the last color band are brown, red, green, blue, purple, and grey and when the centroid distance between the first color band and the second color band on the left end is greater that the centroid distance between the first color band and second color band on the right end, the sequence of reading color codes is inversed for calculating the resistor value.

11. The method for reading resistor value with computer vision according to claim 1, wherein an application comprises an observation table on which a resistor is positionable, an annular light source, a reflection hood, a microscope, and a control unit such that in file establishing or reading of resistor colors, the resistor is positioned on the observation table and through irradiation by the annular light source and reflection by the reflection hood and extraction and transmission of a resistor image by the microscope to the control unit, file establishing or reading of a resistor value can be performed.

12. The method for reading resistor value with computer vision according to claim 3, wherein adjusting the clear color resistor image to the horizontal comprises calculating a directional angle of a single block or a largest one of multiple blocks with a moment of inertia based process and calculating an angle of a centroid line of the block with a lowest moment of inertial process.

* * * * *